Aug. 25, 1964
C. G. MOLLER
3,145,492
DISPLAY DEVICE
Filed Oct. 26, 1962
2 Sheets-Sheet 1
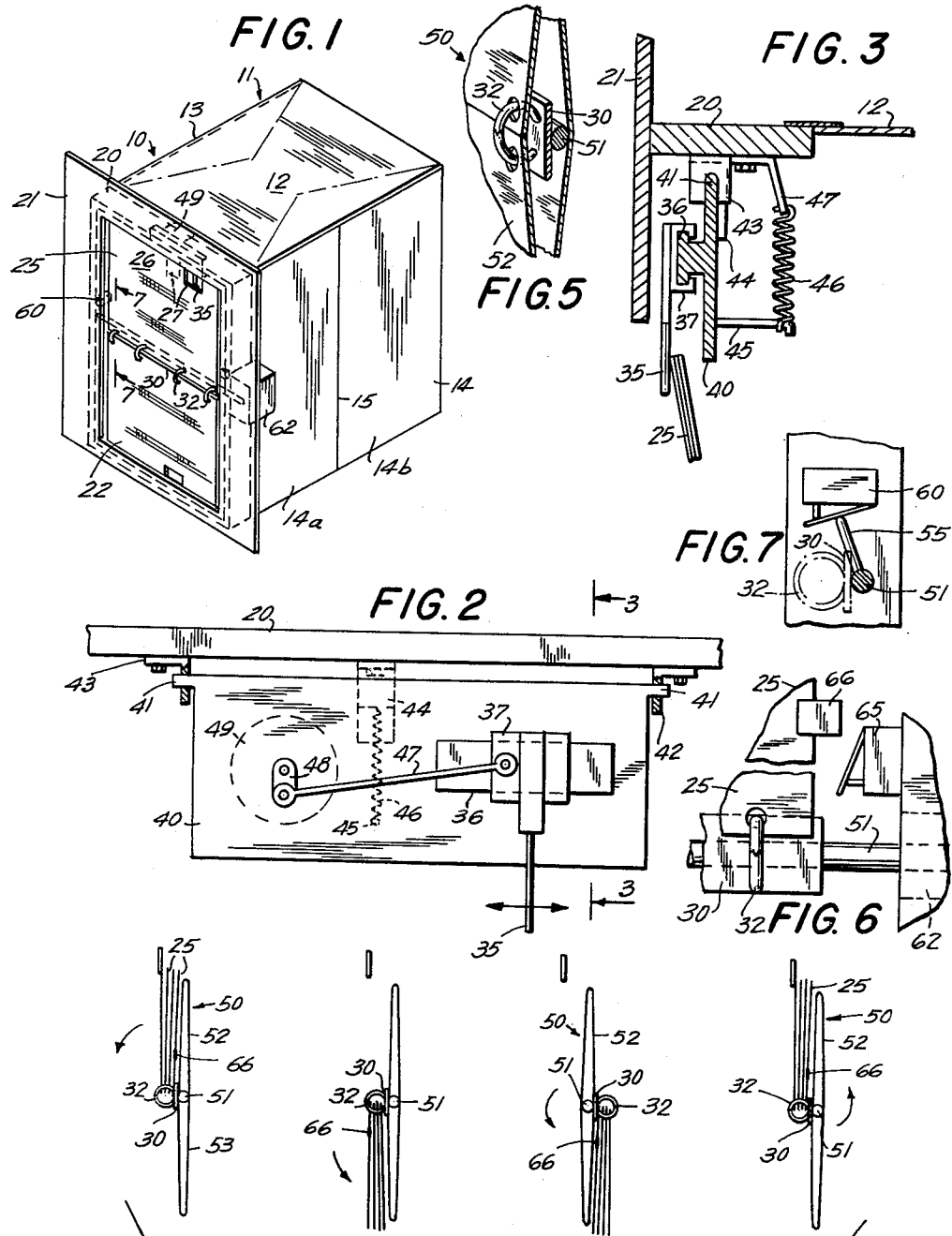
INVENTOR.
CARL G. MOLLER
BY
Dean, Fairbank and Hirsch
ATTORNEYS Aug. 25, 1964
C. G. MOLLER
3,145,492
DISPLAY DEVICE
Filed Oct. 26, 1962
2 Sheets-Sheet 2
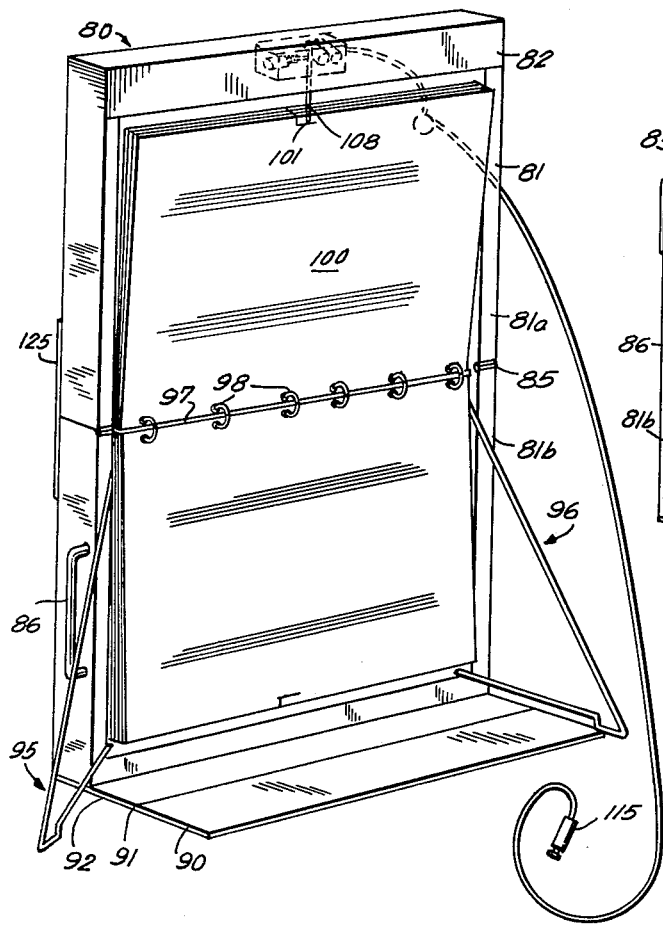
FIG. 8
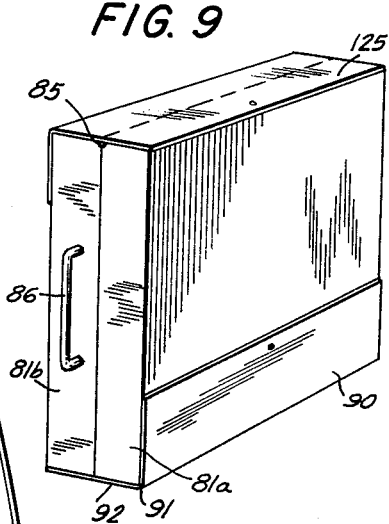
FIG. 9
FIG. 11
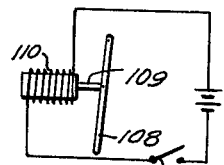
FIG. 10
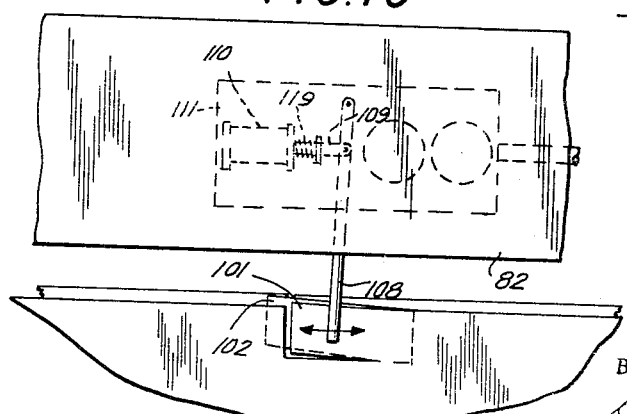
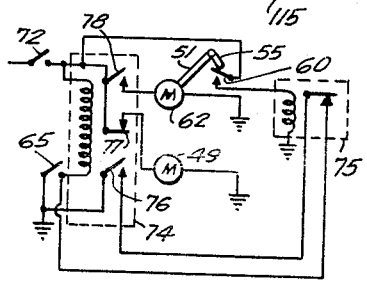
FIG. 12
INVENTOR.
CARL G. MOLLER
BY
Dean, Fairbank and Hirsch
ATTORNEYS United States Patent Office 3,145,492
Patented Aug. 25, 1964

3,145,492
DISPLAY DEVICE
Carl G. Moller, 30 E. 37th St., New York 17, N.Y.
Filed Oct. 26, 1962, Ser. No. 233,215
2 Claims. (Cl. 40—103)

This invention relates to the art of display devices, more particularly to an improved device permitting the seriatum presentation of the front and rear of each of a plurality of indicia bearing sheets, pages, or leaves to view.

As conducive to an understanding of the invention, it is noted that a variety of situations exist in which it is desirable to present information graphically by imprinting the information on indicia bearing portions of one or more sheets or leaves, and exposing the information to view. Where the information is contained on a plurality of sheets, some means are required to facilitate seriatum or sequential presentation of the information bearing areas of the sheets to view.

It is accordingly among the objects of this invention to provide an improved display device permitting the seriatum display of indicia bearing areas of a plurality of sheets on which information has been imprinted.

The novel device has particular utility in conjunction with sales presentations or advertising displays where it is desired to present to view, graphically, a number of separate bits of information.

Another object of the invention is to provide an improved display device subject to ready portability by a salesman or the like individual desirous of graphically illustrating any oral presentation of information.

It is also an object of the invention to provide a novel construction for a display device designed to provide the seriatum presentation of information on a plurality of sheets of material, with the display subject to collapse into a relatively confined volume implementing its portability.

A further object of the invention is to provide a display device in which the display material may readily be replaced to change the display.

According to the invention, the display device comprises a casing subject to collapse into a relatively confined volume of ready portability and storage. The casing in its open, operative position has an opening at the front thereof. A plurality of sheets or leaves having indicia bearing areas upon which the desired information has been imprinted or otherwise applied in conventional fashion are arranged with the indicia bearing areas aligned with the opening and movable therethrough. It is preferred that both the front and rear faces of the sheets or leaves are provided with indicia bearing areas, thus increasing the quantity of material which may be handled by the display device. Hinge means extend across the opening and are secured to said leaves at one end thereof to support same in a fashion permitting rotation of the leaves through the opening. Each sheet or leaf is formed with a marginal leaf retaining portion, and a cutaway part providing a leaf releasing portion. Movably mounted on the frame adjacent the leaf releasing and leaf retaining portions aforementioned, is a leaf engaging member, and motor means are provided to effect movement of the leaf engaging member from the leaf retaining portion to the leaf releasing portion.

An important feature of the invention resides in the formation of the case for the sheets of indicia bearing display material in a fashion such that the case may readily be collapsed into a relatively small volume implementing its portability and storage, at the same time protecting the sheets of material.

Another feature of the invention resides in the formation of the hinge means by the use of a ring binder hinge bar and rings for leaf engagement, thus permitting selective removal and replacement of the desired display material.

In the accompanying drawings in which are shown one or more of various possible embodiments of the several features of the invention, FIG. 1 is a perspective view of the novel display device as embodied in connection with a point of sale advertising display;

FIG. 2 is an enlarged top plan detail view of the leaf engaging member as mounted in the frame of the display device casing illustrated in FIG. 1;

FIG. 3 is a cross sectional view taken on line 3—3 of FIG. 2, illustrating a preferred arrangement for mounting of the leaf engaging member on the frame;

FIG. 4 is a diagrammatic illustration showing the different orientations of the sheet during a given display sequence;

FIG. 5 is a partial detail perspective view of the hinge means and sheet supporting plate;

FIG. 6 is a detail view illustrating the mechanism for controlling the movement of the sheets from a position at the termination of the display sequence to a position permitting commencement of the display sequence;

FIG. 7 is a detail view taken on line 7—7 of FIG. 1 illustrating a proposed control mechanism discontinuing movement of the sheets to their point of commencement;

FIG. 8 is a perspective elevational view of another embodiment of the invention intended for use by salesmen or the like individuals desiring to provide a graphic display for any orally presented material;

FIG. 9 is a perspective view of the novel display device of FIG. 8 shown in a closed, carrying or storage position;

FIG. 10 is a detail view of the sheet engaging mechanism of the display device of FIG. 7, FIG. 11 is a schematic view of the actuating mechanism for the leaf engaging finger of FIG. 10, and FIG. 12 is a schematic wiring diagram of a typical circuit for the display device of FIGS. 1–7.

Referring now to the drawings, in the embodiment of the invention as shown in FIG. 1, the display device 10 is formed with a collapsible casing 11 having a relatively rigid top wall 12 and medially hinged side walls 13 and 14. The side wall 14, is substantially identical to side wall 13 and as shown in the drawings is provided with a panel 14a and 14b hingedly connected to each other along hinge line 15. The walls of casing 11 are preferably made of a relatively rigid sheet material such as corrugated paper stock, sheet plastic, or the like relatively inexpensive material. The hinge 15 may be formed by providing a flexible tape joint between panels 14a and 14b, and similar hinging is provided between the front (to the left as viewed in FIG. 1) of walls 12, 13 and 14 and a frame 20.

Frame 20 formed of wood, steel or the like rigid material is provided with a facade 21 and an opening 22 is formed in the facade opening into the frame, to permit the passage therethrough of sheets or leaves provided with indicia bearing areas 26, perceivable through the opening 22.

Hinge means in the form of a hinge bar 30 extend across the opening 22 at a point substantially midway between the top and bottom thereof. In the illustrated embodiment of the invention, the leaves 25 are shown as moving about a horizontally extending axis, it will however, be apparent to those skilled in the art, that the leaves may readily be moved about a vertically extending axis. In the horizontally extending orientation of the hinge means, the leaves 25 are formed with binder rings 32 extending from hinge bar 30. In the illustrated embodiment of the invention these hinge means are formed of a conventional loose leaf ring binder bar and spring pressed rings.

The sheets or leaves 25 are provided with a leaf retaining portion formed by a marginal edge of the leaf and a leaf releasing portion formed by notch 27, cut into the marginal edge, as shown in FIG. 1. Alternate leaves 25 have notches 27 staggered so that the notch of one will lie above the leaf retaining marginal edge of the other.

Mounted on frame 20 behind facade 21 is a leaf engaging finger member 35, as shown in FIG. 2. Finger member 35 is mounted for reciprocation on slide rail 36 as best shown in FIG. 3. A channel member 37 is secured to the upper end of finger 35, with the channel 37 engaging slide rail 36 so as to maintain the finger 35 in a desired plane. Slide rail 36 is supported on a mounting plate 40, hinged by means of pivot pins 41 extending from plate 40 into pivot holes in downwardly extending legs of right angle pivot brackets 43 as best shown in FIG. 2. As is apparent from FIG. 3, a right angled back stop bracket 44 secured on frame 20 between pivot brackets 43 limits the rearward motion of mounting plate 40, so that the pivoting action of plate 40 is possible only in a clockwise direction as viewed in FIG. 3. Spring arm 45 extends to the right as shown in FIG. 3 from mounting plate 40, and biasing spring 46 anchored at 47 engages arm 45 so as to bias the plate 40 to the position illustrated in FIG. 3.

Coupled to channel 37 is connecting rod 47 secured to crank 48 on the shaft of motor 49, secured on plate 40 as best shown in FIG. 2.

Mounted with hinge bar 30 as best seen in FIGS. 4 and 5, is a sheet supporting plate 50 of an area substantially coextensive with that of the opening in facade 21. Plate 50 and hinge bar 30 are mounted for rotation on pivot rod 51 secured by welding or the like to hinge bar 30. The plate 50 has a normally upper portion 52, this normally upper portion being referred to is the top portion of the plate in its orientation at the commencement of seriatum display of the sheets or leaves of display material as viewed to the left in FIG. 4. A normally lower portion 53 of the plate 50, as viewed to the left in FIG. 4 also results from the mounting of the plate 50 on pivot rod 51.

As shown in FIGS. 4 and 5, the sheet supporting plate is preferably fabricated of sheet material such as cardboard or the like folded double over hinge bar 30 and pivot rod 51 as seen in FIG. 4 to provide a cushioned surface for leaves 25. The front and rear of plate parts 52 and 53 are each provided with indicia bearing areas.

Extending upwardly from pivot rod 51 at one end thereof (to the left as shown in FIG. 1) is a control finger 55 as best shown in FIG. 7. Switch 60 is arranged on the left hand portion of frame 20 as viewed in FIGS. 1 and 7. The switch 60, as best shown in FIG. 12, is electrically connected to energize quick acting time delay relay 75 having normally closed contacts so as to momentarily open the circuit controlling relay 74 having contacts 76, 77 and 78.

At the right side of frame 20 behind facade 21, as illustrated in FIG. 1 and as best shown in FIG. 6, is another switch 65 coupled in a conventional fashion into an electrical circuit controlling the operation of motor 62 so that upon movement of the switch arm of switch 65 to the right, as viewed in FIG. 6, motor 62 will be energized. Movement of the switch arm of switch 65 is obtained by means of a control tab 66 secured to the last of the leaves 25 employed in any given display.

In the embodiment of the invention illustrated in FIGS. 8-11, the novel display device has been embodied in a display device subject to ready portability and storage when not in use. The display device 80, as shown in operative position in FIG. 8, comprises a readily collapsible and portable frame 81 having a facade 82. Frame 81 is formed with two parts 81a and 81b hinged at 85 to permit folding of the frame into a configuration such as illustrated in FIG. 9. The folding of the frame permits substantial reduction of the volume occupied by the novel display device thereby implementing its portability and storage. In its folded configuration, as shown in FIG. 9, it appears to be similar to a salesman's sample case, or brief case. This is obtained by forming the display device with a flap 90 at its lower end as illustrated in FIGS. 8 and 9. Hinged at 91 to flange 92 at the lower part of frame 81b, as shown in FIG. 8, it will be noted that flange 92 forms an extension of the base of lower frame 81b, and that flange 92 has a dimension substantially equal to the thickness of frame 81a so that in its folded or collapsed orientation, frame 81a rests on flange 92. A handle 86 is provided on a side of frame portion 81b as viewed in FIGS. 8 and 9.

Pivotally mounted along each of opposed side walls of lower frame 81b, as best shown in FIG. 8, are two A frame supporting legs 95 and 96 respectively. These legs 95 and 96 are formed of a wire material pivotally engaged with the walls of the lower frame member 81b so that the legs may be moved from a limiting position as viewed in FIG. 8 to a limiting position lying against the leaves contained within the frame of the display device 80.

As in the embodiment of the invention afore-described, hinge means in the form of a loose leaf binder hinge bar 97 are arranged to extend medially through frame 81, the leaves 100 containing the desired indicia are hingedly secured to hinge bar 97 by means of hinge rings 98, loosely engaging the leaves 100. Each of leaves 100 is formed with a tab 101 having an extension 102 going behind the leaf.

This tab 101 is, as shown in FIG. 10, within the bounds of leaves 100. The end of tab 101 adjacent the body portion of the leaves 100 provides a leaf retaining portion, and the extension 102 of the tab provides a leaf releasing portion.

Supported behind facade 82 is a leaf engaging member comprising a leaf engaging finger 108, the lower end of which extends below facade 82 into contact with leaves 100. The upper end of finger 108 is secured within facade 82 to the armature 109 of solenoid motor 110 as shown in FIG. 11. Appropriate dry cells may be arranged along with solenoid motor 110 in motor housing 111 as shown schematically in dot-dash lines in FIGS. 8 and 10. Switch 115 is coupled via appropriate electrical connections to energize solenoid motor 110 as desired. Solenoid motor 110 is of the type employed in door bells in which the circuit is broken when the armature 109 has moved a given distance.

A spring 119 coupled to finger 108 provides quick return of the finger to its initial leaf retaining position.

The frame members 81a and 81b are maintained in their open display position by latching means in the form of a band and snap 125 or the like.

In use, the novel display device permits the seriatum display of a variety of graphically presented materials for view.

In the embodiment of the invention illustrated in FIGS. 1-7, it is contemplated that the display device 10 will be set up either at a point of sale, or in a show window, or the like area where it is desired automatically and sequentially to present for view a variety of graphic material. The desired display material is imprinted or otherwise arranged on the indicia bearing portion of leaves 25 which are then secured in conventional fashion by means of binder rings 32 to hinge bar 30 of the display device.

The display device is set up in operative position by extending the panels 14a and 14b to a stable orientation supporting the top wall 12 so that the entire display device assumes the position shown in FIG. 1. Thereafter, upon making appropriate electrical connections to a conventional source of power by closing switch 72, motor 49 is energized through the normally closed contact 77 of de-energized relay 74. Energization of motor 49 results in the rotation of crank 48 to cause reciprocation of channel 37 on slide bar 36 as best shown in FIG. 2.

Leaf engaging finger 35 reciprocates to and fro in the direction illustrated by the arrows in FIG. 2 moving between a leaf engaging portion of leaves 25 and a leaf releasing portion, namely the notch as illustrated in FIG. 1. Since leaves 25, as shown in FIG. 3, are slightly inclined and normally tend to fall away upon entry of the finger 35 into the leaf releasing portion thereof, each of the leaves upon the finger 35 moving into the leaf releasing notch drops to the lower position. It is preferred that both the front and back of the leaves 25 contain indicia bearing areas. Thus, first the front portion of a given leaf will be viewed at the upper part of the display device, thereafter upon release of the sheet or leaf 25 so that it falls to the lower portion, the rear of the leaf will be subject to view. It is intended that each of the displays extend over the front face of one sheet and the rear face of a lower sheet so that the entire display will provide informational material.

After each of the sheets has been moved from its top position to its bottom position, as illustrated in FIGS. 1 and 4, the last display of the series will be viewed on the indicia bearing portion of page supporting plate 50 and the rear surface of the lowermost sheet 25 as viewed in the second from left sequential step illustrated in FIG. 4. In this position the last sheet will have its control tab 66 contact micro-switch 65 which, referring to FIG. 12, energizes the relay 74 causing contacts 78 and 76 to close, while opening contact 77. Opening of contact 77 de-energizes motor 49, while closing contact 78 energizes motor 62, whereupon shaft 51 will commence rotation of plate 50 through the phases illustrated in the two right hand views in FIG. 4. At this time the display is formed by the indicia bearing portion on the front surface of leaf 25 and the indicia bearing portion of the lower part of plate 50.

When plate 50 has been rotated through 360°, control arm 55 contacts micro-switch 60, energizing quick acting time delay relay 75 to momentarily open its contact, breaking the circuit to relay 74 whereupon contacts 76, 77 and 78 assume their illustrated orientation, breaking the circuit to motor 62 and re-energizing motor 49, to reinstitute commencement of the display presentation.

It will be noted that the finger 35 may be moved by the action of the leaves bearing thereagainst, as a result of the pivotal mounting of plate 40 biased to an operative position by spring 46. Thus, in the event of a jam up, or a desire to return a sheet to a view position without going through the entire cycle, the finger 35 may be lifted against the biasing action of spring 46, which then returns the plate and finger to an operative position.

In use of the embodiment of the invention illustrated in FIGS. 8–11, the display device 80 is carried in the form illustrated in FIG. 9 to a desired point of presentation, and is set up by opening the case to separate frame part 81a from frame part 81b, latching same in this separated position by means of a snap band 125 or the like. Legs 95 and 96 are pulled out of lower frame 81b and positioned to orient the case in a position inclined forwardly, as shown in FIG. 8. The leaves 100 are brought behind the leaf engaging finger 108 bending them to permit them to be moved behind the finger. Thereafter, pressing switch 115 closes the circuit to solenoid motor 110 which causes finger 108 to reciprocate to the left as viewed in FIGS. 8 and 10 to a leaf releasing extension 102 of tab 101 at which time the top leaf falls past the finger under the action of gravity. The finger 108 at the time of release of top sheet is at a point with respect to the next lowest sheet beyond tab 101 of the next sheet so that only the top leaf is permitted to pass, while the sheet immediately behind it contacts the finger 108 at a leaf retaining part of the leaf as shown in FIGS. 8 and 10. The solenoid circuit is broken at the end of the desired limit of travel of finger 108, and spring 119 acts to return finger 108 to its starting point.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A display device comprising in combination a casing having an opening at the front thereof, a rotatably mounted pivot rod extending across said opening, hinge means secured to said pivot rod and extending across said opening, a plurality of leaves supported by said hinge means, said leaves having indicia bearing areas aligned with said opening and movable therethrough, a sheet supporting plate secured to said pivot rod and normally lying in back of said leaves, each of said leaves having a leaf retaining portion and a leaf releasing portion adjacent said indicia bearing areas, a leaf engaging member mounted for movement on said casing from said leaf retaining portion to said leaf releasing portion, motor means coupled to said leaf engaging member to move the same between its limiting position for successive release of said leaves, drive means coupled to said rod to effect rotation thereof, switch means controlling the operation of said motor means and a member controlled by the last of said leaves to actuate said switch to energize said motor means to rotate said pivot rod through 360° whereby said leaves will be repositioned for display.

2. The combination set forth in claim 1 in which said sheet supporting plate comprises a sheet material folded double over said pivot rod.

References Cited in the file of this patent

UNITED STATES PATENTS

| | | |
|---|---|---|
| 1,562,185 | Paxton | Nov. 17, 1925 |
| 2,323,638 | Wise | July 6, 1943 |
| 2,795,067 | Walker | June 11, 1957 |